United States Patent

Clark

[15] 3,636,824
[45] Jan. 25, 1972

[54] UNITARY PISTON ASSEMBLY INCLUDING A BODY MEMBER SERVING BOTH AS A HOLDER FOR SEALING RINGS AND AS PISTON-BEARING MEANS

[72] Inventor: Norman E. Clark, Newark, N.Y.
[73] Assignee: Garlock Inc., Palmyra, N.Y.
[22] Filed: Jan. 13, 1970
[21] Appl. No.: 2,537

[52] U.S. Cl. .................................92/249, 92/258, 277/165
[51] Int. Cl. ..........................................................F16j 1/02
[58] Field of Search.................92/248, 249, 255, 257, 258; 277/165, 277 SM

[56] References Cited

UNITED STATES PATENTS

| 2,429,426 | 10/1947 | Phillips et al. | 92/249 X |
| 2,665,179 | 1/1954 | Salvatora | 92/155 |
| 2,877,071 | 3/1959 | Arndt | 277/165 |
| 3,033,578 | 5/1962 | Kellogg | 277/165 X |
| 3,155,014 | 11/1964 | Genz | 92/258 X |
| 3,388,915 | 6/1968 | Dega | 92/258 X |
| 3,487,897 | 1/1970 | Hahm et al. | 92/245 |

FOREIGN PATENTS OR APPLICATIONS

| 1,059,198 | 11/1953 | France | 92/255 |

Primary Examiner—Martin P. Schwadron
Assistant Examiner—Irwin C. Cohen
Attorney—Robert Henderson

[57] ABSTRACT

A single, ring-holding and bearing member is generally cylindrical and has one or more external parallel-walled grooves for separately carrying sealing rings. This unitary member is a mixture of nylon and mineral fibers which is substantially nonextrusive and capable of swelling under elevated temperature conditions but is substantially noncontractile irrespective of subsequent temperature conditions. Said member, at all axial points, is of substantial radial thickness and capable of swelling radially, upon initial operation, to establish and maintain a firm bearing engagement with the wall of a cylinder in which the piston operates. Such bearing engagement is firm enough to prevent extrusion of sealing rings which are of softer plastic material than the material of said member.

4 Claims, 4 Drawing Figures

PATENTED JAN 25 1972 3,636,824

INVENTOR:
NORMAN E. CLARK

BY Robert Henderson

ATTORNEY 3,636,824

UNITARY PISTON ASSEMBLY INCLUDING A BODY MEMBER SERVING BOTH AS A HOLDER FOR SEALING RINGS AND AS PISTON-BEARING MEANS

BACKGROUND OF THE INVENTION

Attempts to obviate the highly objectionable scoring of piston cylinder walls by metal pistons and sealing rings has resulted in increased use of sealing rings of relatively soft plastic material and piston-bearing rings of somewhat harder plastic material than that of the piston rings.

These attempts, however, leave much to be desired, for they have involved the need for the several sealing rings, bearing rings and metal sleeves or rings for supporting the sealing and bearing rings, to be assembled upon buildup of the piston upon a piston rod.

Such buildup of a piston is excessively time consuming and may lead to incorrect assembling of the parts of the piston with consequent unsatisfactory functioning of the piston or early failure thereof. The parts of the unitary piston assembly of this invention are economically factory-assembled, assuring proper association of the assembly's parts at reduced cost.

Moreover, the piston parts in which sealing rings have hitherto been disposed have had some clearance relatively to a related cylinder wall and/or have been of relatively soft material so that extrusion of plastic-sealing ring material from their related grooves has not been adequately opposed. The ring-holding and bearing member of this invention is of material which is a mixture of a plastic material and enough mineral material to render said member hard enough to prevent such objectionable extrusion. Said member nonshrinkably swells upon initial operation of the piston to permanently so engage the wall of a related piston cylinder as to leave no space into which such extrusion could occur.

THE DRAWING

DETAILED DESCRIPTION

Figure 1:
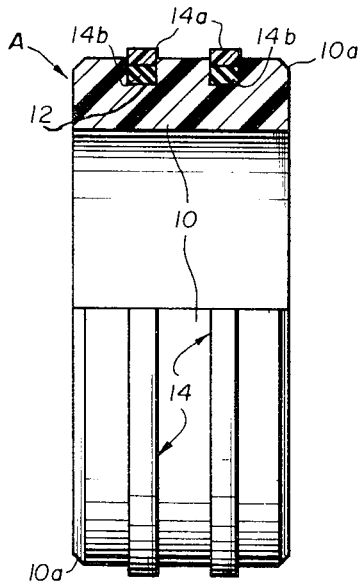
FIG. 1 is a side view of a preferred form of unitary piston assembly, according to this invention, the upper half of this figure being in central, longitudinal section, and the lower half being in elevation.

Referring to FIG. 1, the illustrated unitary assembly A comprises a generally cylindrical body member 10 of hard, mineral filled, plastic material formed with two continuous, spaced, external, parallel-walled grooves 12 within which are disposed two-sealing rings 14. Each of the illustrated rings 14, preferably, comprises an outer annular member 14a of polytetrafluoroethylene (hereinafter referred to for convenience as "Teflon") and an inner annular member 14b of relatively soft rubber, preferably bonded within the annulus 14a. The members 14a and 14b are rectangular in shape in cross section, and their opposite sides are parallel to each other and to the opposed sidewalls of their related grooves. The side, outer edges of the body member 10 are preferably chamfered as at 10a.

Figure 2:
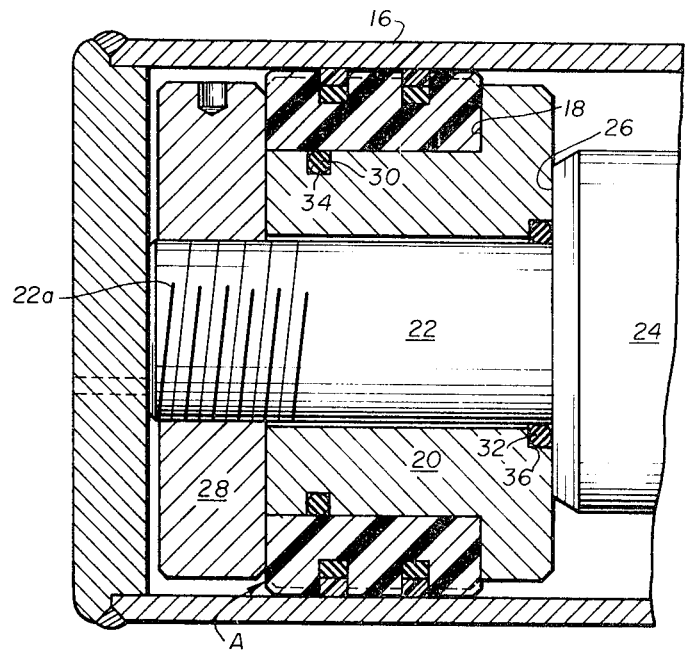
FIGS. 2 and 3 are central, longitudinal, sectional views illustrating two of many possible ways in which said unitary assembly may be associated with a fragmentarily shown piston rod, piston cylinder and means by which said assembly is mounted on the piston rod.

As illustrated in FIG. 2, the unitary assembly A may be employed as a part of a piston working in a cylinder 16. Said assembly is disposed in an external annular rabbet 18 of a filler ring 20, preferably of suitable metal such as steel, mounted on a reduced end portion 22 of a piston rod 24, the unitary assembly and the filler ring being firmly held in their stated interrelationship and against a shoulder 26 of the piston by a nut 28 tightened upon a threaded end 22a of the reduced end portion 22 of the piston rod 24. The unitary assembly A is sealed with respect to the filler ring 20 by a rubber "O"-Ring 30, and the filler ring is sealed with respect to the piston rod 24 by a rubber "O"-ring 32; these two "O"-rings being suitably disposed in grooves 34 and 36 formed in the filler ring.

Figure 3:
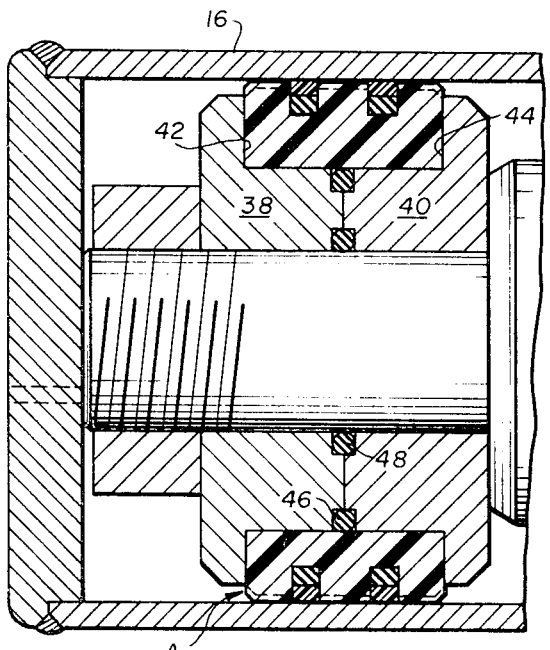

Another of various ways of employing the unitary assembly A as part of a piston is illustrated in FIG. 3, which differs from the arrangement of FIG. 2 chiefly in providing a pair of filler rings 38, 40 (rather than a single filler ring), mounted on a piston rod and serving to carry the unitary assembly in opposed, external, annular rabbets, 42, 44 formed in said filler rings. The paired filler rings are sealed, with respect to the assembly A and the piston rod, by rubber "O"-rings 46, 48.

Figure 4:
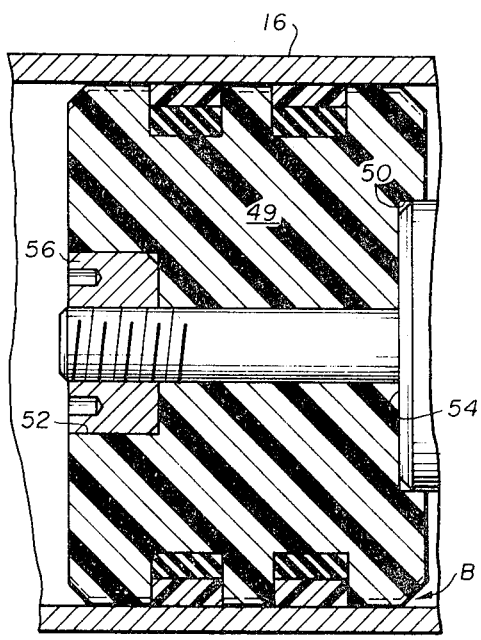
FIG. 4 is a view, generally like FIGS. 2 and 3, but showing an assembly, according to this invention, wherein the assembly substantially constitutes an entire piston.

There is illustrated in FIG. 4, a modified unitary assembly B which includes a body portion 49 of hard, plastic-mineral material. This assembly is designed to serve as an entire piston which is mounted directly upon a piston rod without the use of filler rings or other more or less equivalent parts. Although such an entire piston may be of approximately the same general cross-sectional shape as assembly A, it is illustrated as formed with counterbores 50, 52 at opposite ends, to receive therein, respectively, a shoulder 54 of the related piston rod and a nut 56 for securing the piston on said rod.

It will be realized that, in all the illustrated piston arrangements, the unitary assembly A or B could not be inadvertently installed incorrectly upon other piston parts or directly upon a related piston rod; and, moreover, that proper installation of a piston upon a piston rod is very easily accomplished with economy of time.

In both assemblies A and B, the sealing rings 14 are factory-applied by sliding them endwisely onto the body portion 10, or equivalent part, over a conical expander device (not shown) which stretches the rings sufficiently to enable them to slide over the ends of the body portion to the point where they contract and become seated within the grooves 12. As a practical matter, the sealing rings could ordinarily be applied only where such an expander device is available so that, if the sealing rings are not factory-applied, the body portion 10, or equivalent part, would have to be in at least three parts, leading to excessive assembling time and an increased possibility that the parts would be incorrectly assembled.

Sealing rings useful within this invention may have the inner, rubber ring 14b separate from the outer, Teflon ring 14a; or may have a separate rubber "O"-ring or other means for expanding the Teflon ring.

The plastic-mineral material of the body members 10 (FIGS. 1–3) or of the body member of the piston of FIG. 4 is preferably a solidified, homogeneous mixture of nylon and glass in such proportions as to give said members a hardness materially greater than the outer members 14a of the sealing rings but materially less than the metal of cylinder 16 within which the pistons operate. A material known as "Marblock" is thus constituted and is of such hardness and other characteristics as to be suitable for said body members.

As shown in FIG. 1, which illustrates the assembly A as before installation in a piston cylinder, the outside diameter of the sealing rings 14 is slightly greater than the outside diameter of the body member 10. This initial diameter of the body member is indicated in broken lines in FIGS. 2–4.

After installation and upon initial operation of the piston, the heat, developed thereby and/or from the fluid being moved by the piston, causes the body member 10 to swell to such greater diameter as to become, slidably engaged with the cylinder 16, as in full lines in FIGS. 2–4, and thereby function as piston-bearing means to guide and center the piston in the cylinder.

The materials of the components of the piston are such as to minimize wear, and the body member limits the wear of the sealing rings to that which stems from their sealing function.

It will be observed that the sidewalls of the grooves 12, adjoin the outer cylindrical surface of the body member 10 at a sharp angle, and that, due to the close, bearing fit of the body member within the cylinder 16, there is no avenue of escape for the relatively soft material of the sealing rings to extrude from said grooves.

It may be observed that, with a preferred composition of material for the body member 10, the latter may swell as explained, but retains its swollen condition even in the presence of cooling upon discontinuation of operation of the piston. Thus, after initial operation, the body member 10 is always in condition for immediate service for bearing purposes upon subsequent intermittent operation.

It should also be observed that where a unitary assembly A or B includes two or more sealing rings, the spacing between the latter and also between the end rings and the ends of the body member 10 should be substantial; preferably at least as great as the width of a groove 12. Such spacing affords substantial bearing capacity in the body member.

It is desirable, also, that the general radial thickness of the body member 10 be substantial; preferably greater than the depth of a groove 12, thereby providing substantial capacity in the body member to swell radially.

It will be realized that this invention, as set forth in the accompanying claims, may be practised in various ways other than those disclosed herein.

I claim:

1. A piston assembly comprising a one-piece, generally cylindrical body member of relatively hard, homogeneous, mixture of nylon and mineral fibers formed with an external circumferential groove having opposed, parallel, flat sidewall surfaces extending perpendicularly to the axis of said body member and adjoining outer cylindrical surfaces of said body member at sharp angles, and a sealing ring comprising a cross-sectionally rectangular inner annular component of relatively soft rubber and a cross-sectionally rectangular outer annular component of polytetrafluoroethylene occupying said groove, said sealing ring having flat, opposite side surfaces in intimate engagement with said flat surfaces of said groove, and extending outwardly, prior to usage, beyond the outer cylindrical confines of said body member; the material of said body member being radially expansible under elevated temperature conditions to an outside diameter approximately as great as but no greater than the outside diameter of said sealing ring but being incapable of material contraction thereafter irrespective of temperature conditions.

2. A piston assembly according to claim 1, said body member being provided with an additional groove and sealing ring therein having the identically defined characteristics of the first-named groove and sealing ring.

3. The combination of a pressure cylinder and a piston operating therein in engagement with an inner wall surface of said cylinder; said piston comprising a one-piece, generally cylindrical body member of relatively hard, homogeneous, mixture of nylon and mineral fibers formed with an external circumferential groove having opposed, parallel, flat sidewall surfaces extending perpendicularly to the axis of said cylinder and adjoining outer cylindrical surfaces of said body member at sharp angles, and a flat-sided sealing ring comprising a cross-sectionally rectangular inner annular component of relatively soft rubber and a cross-sectionally rectangular outer annular component of polytetrafluoroethylene occupying said groove and extending into sliding sealing engagement with said wall surface of the cylinder; the material of said body member being radially expansible under elevated temperature conditions upon initial operation to cause the outer cylindrical surfaces of the body member to engage said cylinder wall as bearing means for the piston, and being substantially noncontractile irrespective of subsequent temperature conditions, to maintain the capability of said body member as bearing means for the piston in relation to said cylinder wall.

4. The combination according to claim 3, further including an additional groove and sealing ring therein having the identically defined characteristics of the first-named groove and sealing ring.

* * * * *